United States Patent
Imaizumi et al.

(10) Patent No.: US 6,636,557 B2
(45) Date of Patent: Oct. 21, 2003

(54) DESPREADING CIRCUIT

(75) Inventors: Ichiro Imaizumi, Tokyo (JP);
Tetsuhiko Miyatani, Tokyo (JP);
Shunji Abe, Tokyo (JP); Kenzo Urabe,
Tokyo (JP); Hitoshi Kato, Akita (JP)

(73) Assignee: Kokusai Electric Co., Ltd., Tokyo (JP)

( * ) Notice: Subject to any disclaimer, the term of this patent is extended or adjusted under 35 U.S.C. 154(b) by 56 days.

(21) Appl. No.: 09/947,344

(22) Filed: Sep. 7, 2001

(65) Prior Publication Data
US 2002/0051484 A1 May 2, 2002

Related U.S. Application Data

(63) Continuation of application No. 09/290,398, filed on Apr. 13, 1999, now Pat. No. 6,301,292.

(30) Foreign Application Priority Data

Apr. 14, 1998 (JP) .......................................... P10-102424

(51) Int. Cl.$^7$ ................................................ H04B 1/69
(52) U.S. Cl. ........................ 375/147; 375/149; 375/150
(58) Field of Search ................................. 375/149, 150, 375/152, 343, 355, 362, 364, 365, 366, 367, 368, 145, 130, 147; 708/714

(56) References Cited

U.S. PATENT DOCUMENTS

| | | | | |
|---|---|---|---|---|
| 5,086,405 A | * | 2/1992 | Chung et al. ............... | 708/505 |
| 5,659,574 A | * | 8/1997 | Durrant et al. .............. | 375/150 |
| 5,671,221 A | * | 9/1997 | Yang ........................... | 370/320 |
| 5,768,306 A | * | 6/1998 | Sawahashi et al. .......... | 375/150 |
| 5,799,034 A | * | 8/1998 | Walley et al. ............... | 375/140 |
| 5,812,593 A | * | 9/1998 | Kaku ........................... | 375/150 |
| 5,903,596 A | * | 5/1999 | Nakano ....................... | 375/150 |
| 5,982,763 A | * | 11/1999 | Sato ............................ | 370/342 |
| 5,991,330 A | * | 11/1999 | Dahlman et al. ............ | 375/149 |
| 5,999,562 A | * | 12/1999 | Hennedy et al. ............. | 375/152 |
| 6,026,115 A | * | 2/2000 | Higashi et al. .............. | 375/148 |
| 6,094,449 A | * | 7/2000 | Komatsu ...................... | 375/136 |
| 6,108,370 A | * | 7/2000 | Naruse ........................ | 375/150 |
| 6,208,685 B1 | * | 3/2001 | Yamazaki .................... | 375/152 |

FOREIGN PATENT DOCUMENTS

| | | |
|---|---|---|
| JP | 9-107271 | 4/1997 |
| JP | 11-68616 | 3/1999 |

* cited by examiner

Primary Examiner—Tesfaldet Bocure
(74) Attorney, Agent, or Firm—Jacobson Holman PLLC

(57) ABSTRACT

A despreading circuit which can reduce a circuit scale and power consumption is described. The circuit includes an A/D converter which converts a CDMA modulated analog signal to a digital signal of N bits, and a searcher which defects a synchronization phase from high-order small bits of the N bits and outputs synchronozation phase information to a control circuit. The control circuit transmits a signal for allowing despreading to be performed to a sliding correlator based on the phase information. The sliding correlator despreads the N bit digital signal outputted by the A/D converter and outputs the resulting correlation output as a despreading signal.

4 Claims, 13 Drawing Sheets

DESPREADING CIRCUIT

This is a continuation of application Ser. No. 09/290,398, filed Apr. 13, 1999, now U.S. Pat. No. 6,301,292.

BACKGROUND OF THE INVENTION

1. Field of the Invention

The present invention relates to a despreading circuit of a receiver of a spread spectrum communication system such as mobile communication, radio LAN and the like, particularly to a simple despreading circuit which can reduce power consumption.

2. Description of the Related Art

In a spread spectrum communication system, in general, transmission data is narrow-band modulated (primary modulation) on a transmission side, and narrow-band modulated transmission data is further spread/modulated (secondary modulation), and the data subjected to the two-stage modulation is transmitted/outputted. Received data is despread on a reception side to extract the narrow-band modulated data, and a base band signal is regenerated in an ordinary wave detection circuit.

A conventional despreading circuit will be described with reference to FIG. 11. FIG. 11 is a block diagram of the conventional despreading circuit.

In the conventional despreading circuit, a sliding correlator constituted of a logic circuit is used, which performs capture in synchronization with a symbol break point and computes correlation in a synchronized phase.

Specifically, as shown in FIG. 11, the conventional sliding correlator is constituted of A/D converter 1, multiplier 2, PN code register 3, adder 4, and delay element 5.

Each section will be described hereinafter in detail. The A/D converter 1 receives a CDMA modulated analog signal, and converts the signal to a digital signal to output the signal.

The multiplier 2 multiplies and outputs PN code transmitted from the PN code register 3 and the signal transmitted from the A/D converter 1 for each chip.

The PN code register 3 transmits PN code (pseudo noise code) as a spread code to the multiplier 2.

Since one symbol is generally spread with a plurality of bits, the PN code has a multi-bit length, and the bit length is called the number of chips.

Additionally, a timing of PN code register 3 to output the PN code is based on an instruction from outside, and one bit is outputted every one chip time (obtained by dividing one symbol time by the number of chips).

The adder 4 adds and outputs signals transmitted from the delay element 5 and multiplier 2.

Moreover, the adder 4 transmits the added signal (correlation value) as a correlation output to the outside when one symbol time elapses after addition is started.

The delay element 5 delays the signal outputted by the adder 4 only by one chip time, returns it to the adder 4 and outputs it.

Specifically, the signal outputted by the multiplier 2 is accumulated/added over one symbol time by operation of adder 4 and delay element 5, so that the correlation output can be obtained after one symbol time elapses.

An operation of the conventional sliding correlator will next be described. The CDMA modulated analog signal is converted to a digital signal by the A/D converter 1, and multiplied by the PN code outputted by the PN code register 3 in the multiplier 2.

Subsequently, the adder 4 adds the signal outputted by the multiplier 2, and the signal returned from the delay element 5 over one symbol time to output the correlation output.

The correlation value for one symbol time is obtained as the correlation output in this manner.

Here, the synchronization phase can be detected as a point at which the correlation output reaches its peak, but when the sliding correlator is used, the correlation output cannot be obtained until one symbol time elapses. Therefore, the correlation output is obtained using each chip as a symbol start point, and the synchronization capture is attained in such a manner that the correlation output peaks. In general, it takes one symbol time multiplied by the number of chips to obtain the peak of the correlation output.

To solve the problem, a plurality of sliding correlators corresponding to the number of chips are arranged in parallel, and the correlation output is computed at a timing deviated by each chip in each sliding correlator. In this method, the synchronization capture is attained in a short time, but a circuit scale is impractically large.

On the other hand, in the conventional despreading circuit, as shown in FIG. 12, a matched filter may be used. FIG. 12 is a block diagram of the despreading circuit using the conventional matched filter.

As shown in FIG. 12, the matched filter is constituted of an A/D converter 11, sample hold circuit 12, multiplying means 13, PN code register 14, and adding means 15.

Each section will be described hereinafter in detail.

The A/D converter 11 receives a CDMA modulated analog signal, converts it to a digital signal of N bits, and outputs it, in the same manner as the A/D converter 1 in the sliding correlator.

Here, in consideration of signal precision, the A/D converter 11 preferably converts the analog signal to the digital signal of about six bits.

The sample hold circuit 12 is formed by connecting flip-flop circuits (D-FF) corresponding to the number of chips per one symbol in multiple stages. Each time the N bit signal is received from the A/D converter 11, the N bit signal transmitted from the previous D-FF is held. Moreover, the present held signal is successively transmitted to the next D-FF, and additionally transmitted to the multiplier 13.

Additionally, the first D-FF holds the N bit signal transmitted from the A/D converter 11, instead of the signal transmitted from the previous D-FF.

Specifically, the sample hold circuit 12 is provided with output terminals corresponding to the oversample multiple of the number of chips per one symbol to successively move the N bit signal transmitted from A/D converter 11 for each chip to the next output terminal and emit an output.

The multiplying means 13 is provided with a plurality of multipliers for the D-FFs of sample hold circuit 12 to multiply the N bit signal transmitted from each associated D-FF and the corresponding PN code transmitted from the PN code register 14 and output the N bit signal.

The PN code register 14 is the same as the PN code register 3 of the sliding correlator, except that the PN code for each chip is transmitted to the associated multiplier of the multiplying means 13.

As shown in FIG. 13, the adding means 15 is provided with a plurality of adders 20a to 20n to add the N bit signal transmitted from the multiplying means 13 and emit the correlation output of N bits. FIG. 13 is a block diagram of adding means 15.

As shown in FIG. 13, the adding means 15 is constituted of a plurality of adders 20 and an adder 23.

Moreover, each adder 20 is constituted of a plurality of adders 21, and flip-flop circuits (D-FF) 22 connected to the adders 21.

Specifically, a first adder 20a adds each two sets of a plurality of N bit signals transmitted from the multiplying means 13 by the adder 21, adjusts a timing by the D-FF 22, and outputs a set of the ½ number of N bit signals.

Specifically, as shown in FIGS. 12 and 13, when the number of chips per symbol is 256, the number of N bit signals outputted by the multiplying means 13 is 256 corresponding to the oversample multiple of the chips. Therefore, the number of N bit signals outputted by the first adder 20a is 128 corresponding to half of the oversample multiple of the chips.

Furthermore, a second adder 20b adds each two signals of a plurality of signals transmitted from the first adder 20a by the adder 21, adjusts the timing by D-FF 22, and outputs a set of the ½ number of N bit signals.

The set of a plurality of signals transmitted from the multiplying means 13 is successively added/synthesized by the adders 20a to 20n to reduce the signals by half. When two signals remain, the two signals are added by the adder 23 to transmit the correlation output to the outside.

An operation of the despreading circuit using the conventional matched filter will next be described.

The CDMA modulated analog signal is converted to the digital signal by the A/D converter 11, held for each sample by the sample hold circuit 12, successively fed rearward, and transmitted to the multiplying means 13.

Subsequently, the multiplying means 13 receives signal inputs corresponding to the number of samples, multiplies the inputs by the corresponding PN code transmitted from the PN code register 14, and emits an output.

Subsequently, the adding means 15 collectively adds/synthesizes the signals outputted by the multiplying means 13, and transmits the correlation output to the outside.

Additionally, the matched filter is broadly applied in the receiver of the spread spectrum communication, and the prior art regarding the matched filter is described, for example, in "Digital Matched Filter for Direct Spread Spectrum" of Japanese Patent Application Laid-open No. 107271/1997.

Moreover, the sliding correlator and matched filter for use in the spread spectrum communication are described in "Despreading Device and Receiver" of Japanese Patent Application Laid-open No. 68616/1999.

As described above, in the despreading circuit using the conventional sliding correlator, the number of gates is small, power consumption can be reduced, but much time is disadvantageously required from when the synchronization capture is attained until the correlation output is obtained.

Moreover, in the despreading circuit using the matched filter, since the correlation output is obtained for each phase, the time from when the synchronization capture is attained until the correlation output is obtained is short, but the number of gates is increased in accordance with the number of chips. Accordingly, the power consumption is disadvantageously increased.

SUMMARY OF THE INVENTION

The present invention has been developed in consideration of the above circumstances, and an object thereof is to provide a despreading circuit which can reduce a circuit scale and power consumption.

The present invention provides a despreading circuit which comprises a searcher using a matched filter for capturing synchronization to capture the synchronization from high-order one bit or a plurality of small bits of an input signal; and a sliding correlator for, on capturing the synchronization, despreading the input signal to perform demodulation, so that the circuit scale and power consumption can be reduced.

Moreover, the present invention provides a despreading circuit which comprises an A/D converter for receiving a CDMA modulated analog signal and converting it to a digital signal of N bits to emit an output; a searcher for detecting a synchronization phase as a symbol start point of the CDMA modulated analog signal based on a high-order k bit signal of the N bit digital signal outputted by the A/D converter to output phase information as a signal indicating the synchronization phase; a control circuit for outputting a signal for allowing despreading to be performed as a timing for starting the despreading in accordance with the phase information transmitted from the searcher; and a sliding correlator for receiving the signal for allowing the despreading to be performed, and starting the despreading of the N bit digital signal outputted by the A/D converter to output a correlation output for one symbol time as a demodulated signal, so that the circuit scale and power consumption can be reduced.

Furthermore, in the despreading circuit of the present invention, the searcher detects the synchronization phase as the symbol start point of the CDMA modulated analog signal based on a signal of high-order one bit of N bits outputted by the A/D converter, and outputs the phase information as the signal indicating the synchronization phase, so that the circuit scale and power consumption can be reduced.

Moreover, in the despreading circuit of the present invention, the searcher detects a symbol of a direct wave of the CDMA modulated analog signal, and the synchronization phase as a symbol start point of a single or a plurality of delay waves, and outputs a plurality of phase information as signals indicating the synchronization phases of the direct wave and the delay wave. The sliding correlators are provided corresponding to the number of the phase information detected and outputted by the searcher to receive the signal for allowing the despreading to be performed from the control circuit at a timing corresponding to each phase information, start the despreading of the N bit digital signal outputted by the A/D converter and to output the correlation output for one symbol time as the demodulated signal. The control circuit selects the corresponding sliding correlator for the plurality of phase information transmitted from the searcher, and transmits to the selected sliding correlator the signal for allowing the despreading to be performed in accordance with the phase information. The demodulated signal transmitted from each sliding correlator can be RAKE synthesized by adjusting the timing.

Additionally, in the despreading circuit of the present invention, an operation of capturing the synchronization in the searcher is performed intermittently, so that the power consumption can be reduced.

Moreover, in the despreading circuit of the present invention, the searcher comprises a sample hold circuit provided with flip-flop circuits connected in multiple stages in accordance with the number of chips for, on receiving an input of digital signal, successively transmitting the digital signal to the next flip-flop circuit while the digital signal is held in the flip-flop circuit; multiplying means provided with multipliers for the flip-flop circuits of the sample hold circuit for, when the digital signal held by the flip-flop circuit connected to each multiplier is successively transmitted to the next flip-flop circuit, multiplying the digital signal and the corresponding bit of PN code as a separately inputted spread code by each multiplier to emit an output; adding means for collectively adding the digital signals outputted by the multipliers of the multiplying means to output the correlation output; and a PN code register for transmitting the PN code as the spread code to the multiplying means, so that the circuit scale and power consumption can be reduced.

Furthermore, in the despreading circuit of the present invention, the adding means has a plurality of CMOS inverters corresponding to the bits in the digital signals outputted by the multipliers of the multiplying means, to add outputs of the plurality of CMOS inverters and emit an output. The CMOS inverter outputs a voltage of a specific level when a value of the corresponding bit of the digital signals transmitted from the multipliers is "0", and outputs a voltage of a ground level when the bit value is "1", so that the circuit scale and power consumption can be reduced.

Moreover, in the despreading circuit of the present invention, the adding means comprises constant-current supply means for supplying an electric current in accordance with each bit value in the digital signals outputted by the multipliers of the multiplying means; a CMOS inverter provided for each bit in the digital signals outputted by the multipliers of the multiplying means to output a specific positive current when the corresponding bit value of the digital signals is "0" and output a specific negative current when the bit value is "1"; and output means for converting the electric currents outputted by the plurality of CMOS inverters to voltage signals to emit outputs, so that the circuit scale and power consumption can be reduced.

Furthermore, in the despreading circuit of the present invention, the constant-current supply means is provided with electric current input and output MOS transistors for the CMOS inverters. The MOS transistor is weighted in accordance with each bit in the digital signals outputted by the multipliers of the multiplying means, so that circuit scale and power consumption can be reduced.

DESCRIPTION OF REFERENCE NUMERALS

1 . . . A/D converter, 2 . . . multiplier, 3 . . . PN code register, 4 . . . adder, 5 . . . delay element, 11 . . . A/D converter, 12 . . . sample hold circuit, 13 . . . multiplying means, 14 . . . PN code register, 15 . . . adding means, 20 . . . adder, 21 . . . adder, 22 . . . flip-flop circuit, 23 . . . adder, 31 . . . A/D converter, 32 . . . searcher, 33 . . . sliding correlator, 34 . . . control circuit, 41 . . . sample hold circuit, 42 . . . multiplying means, 43 . . . PN code register, 44 . . . adding means, 51 . . . multiplier, 52 . . . PN code register, 53 . . . adder, 54 . . . delay element, 61, 61' . . . constant-current supply means, 62 . . . CMOS inverter, 63 . . . output means, 71 . . . constant-current generating section, 72 . . . current supply section, 81 . . . long-channel MOS, 82 . . . p-channel MOS, 83 . . . first n-channel MOS, 84 . . . second n-channel MOS, 85 . . . p-channel MOS, 86 . . . n-channel MOS

DESCRIPTION OF THE PREFERRED EMBODIMENT

A preferred embodiment of the present invention will be described with reference to the drawings.

In a despreading circuit according to the embodiment of the present invention, a matched filter is used only as a searcher for capturing synchronization with a small number of most significant bits which is one or more bits but less than N bits. After the synchronization capture is attained, demodulation is performed by a sliding correlator. Therefore, a precision required for the matched filter does not need to be raised, the synchronization capture is attained with the bits and, subsequently, only the sliding correlator having small circuit scale is operated to perform demodulation, so that the circuit scale and power consumption can be reduced.

Figure 1:
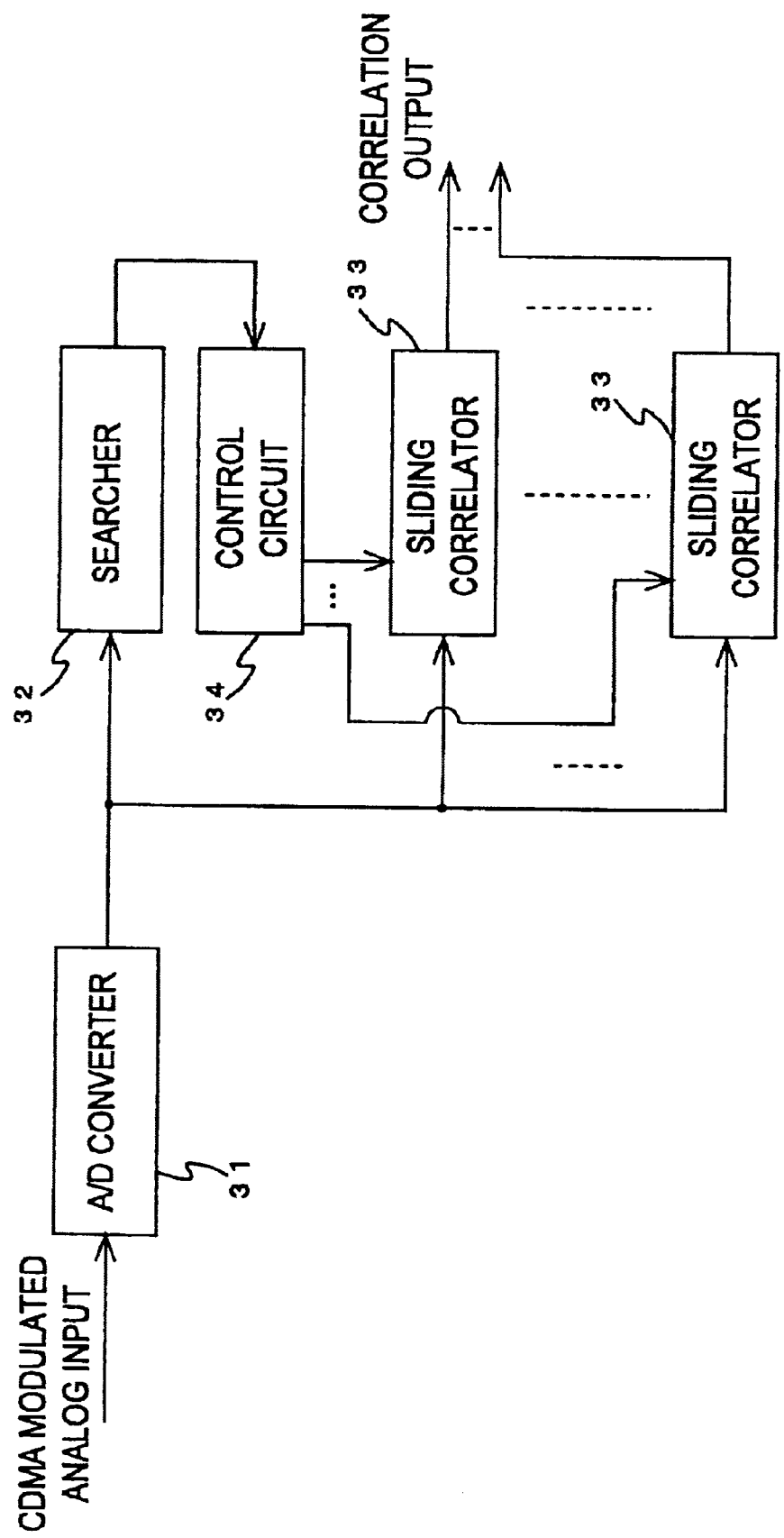
FIG. 1 is a block diagram of a despreading circuit according to an embodiment of the present invention.
Figure 2:
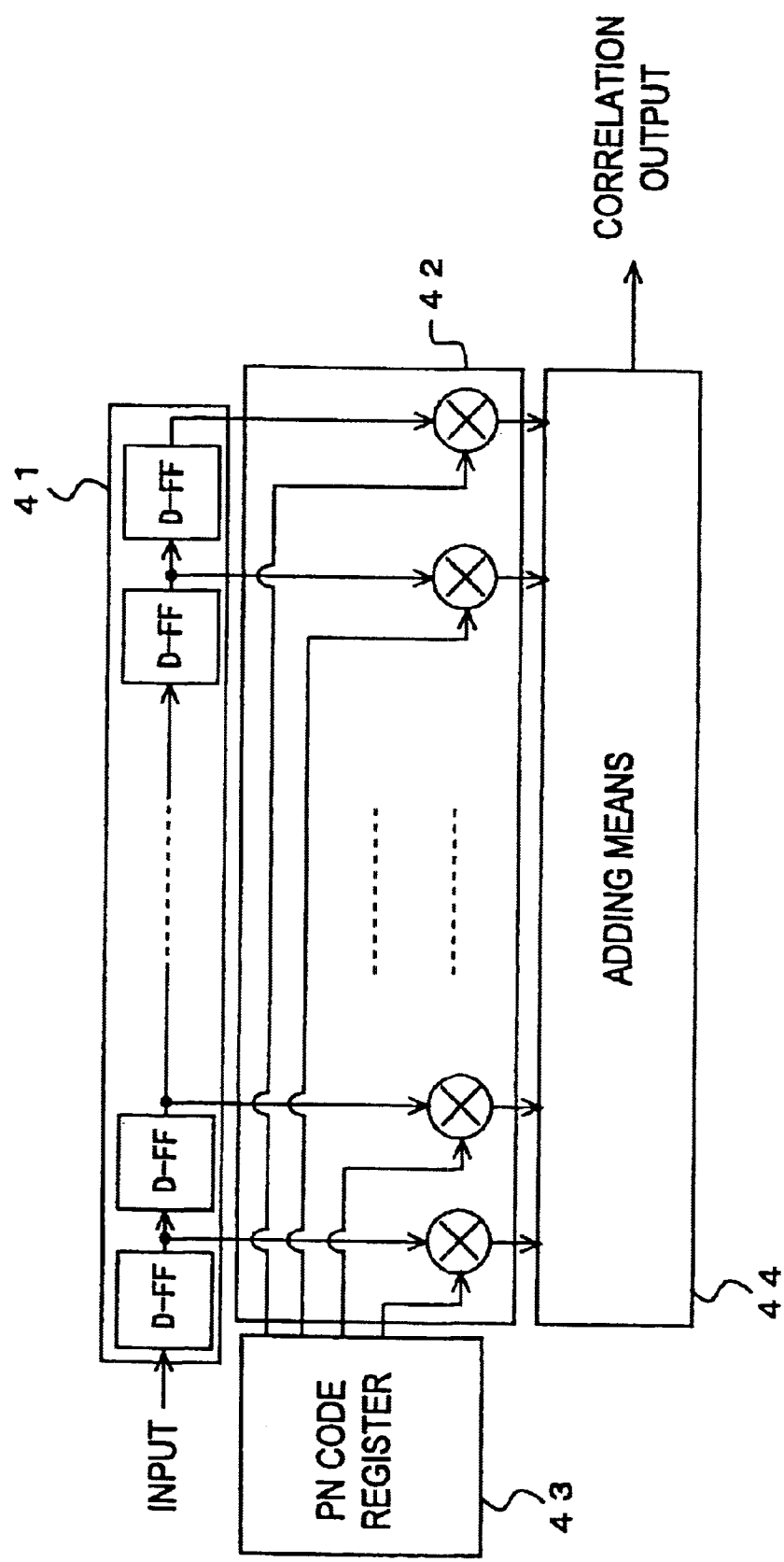
FIG. 2 is a block diagram of a searcher 32 of the despreading circuit according to the embodiment of the present invention.
Figure 3:
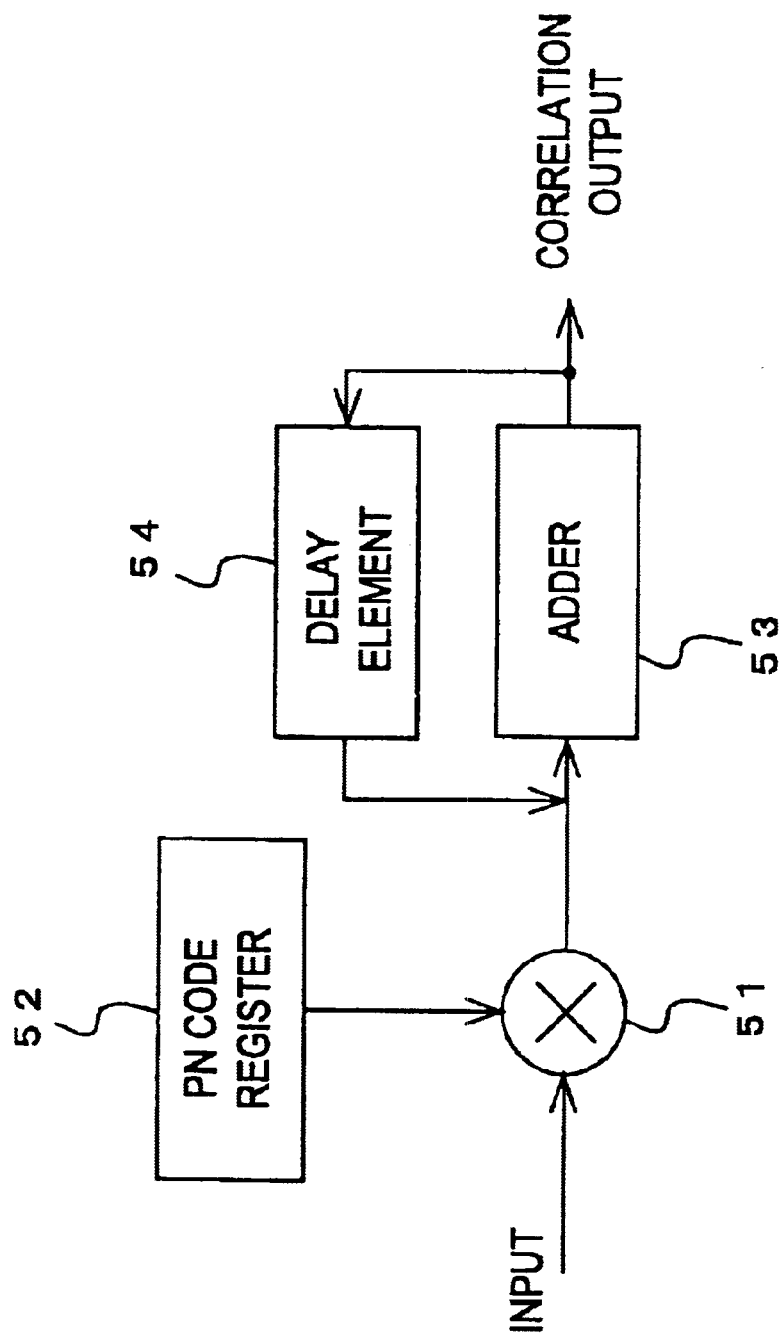
FIG. 3 is a block diagram of a sliding correlator 33 according to the embodiment of the present invention.

A despreading circuit (the present circuit) according to the embodiment of the present invention will be described with reference to the drawings. FIG. 1 is a block diagram of the present circuit, FIG. 2 is a block diagram of searcher 32 of the present circuit, and FIG. 3 is a block diagram of a sliding correlator 33 of the present circuit.

As shown in FIG. 1, the present circuit is mainly constituted of an A/D converter 31, searcher 32, a single or a plurality of sliding correlator(s) 33, and control circuit 34.

Each section will be described hereinafter in detail.

The A/D converter 31 receives a CDMA modulated analog signal, converts it to a digital signal of N bits and emits an output.

The searcher 32 receives a small number of most significant bit signal of N bit digital signals outputted by the A/D converter 31 to detect a symbol start position, and transmits a signal (hereinafter referred to as the phase information) indicating the detected position (synchronization phase) to the control circuit 34.

Specifically, as shown in FIG. 2, the searcher 32 comprises a sample hold circuit 41, multiplying means 42, PN code register 43, and adding means 44.

Additionally, an operation of searcher 32 will be described later in detail.

Here, the sample hold circuit 41 is provided with flip-flop circuits (D-FF) corresponding to the number of chips to receive the small number of most significant bit signal of the N bit signal outputted by the A/D converter 31, hold the small number of most significant bit signal for one chip in each D-FF and successively transmitit rearward to the multiplying means 42.

Here, the small number of most significant bits may include a high-order one bit, high-order two bits or another high-order k-bits, in which k<N. Moreover, the multiplying means 42 is provided with a plurality of multipliers for D-FFS of sample hold circuit 41, and each multiplier receives small number of most significant bit signals corresponding to the number of chips from the corresponding D-FF of sample hold circuit 41 to multiply them by PN code transmitted from the PN code register 43 and emit an output.

The PN code register 43 holds a plurality of PN codes as spread codes corresponding to the number of chips, and transmits each PN code to the corresponding multiplying means 42.

Figure 13:
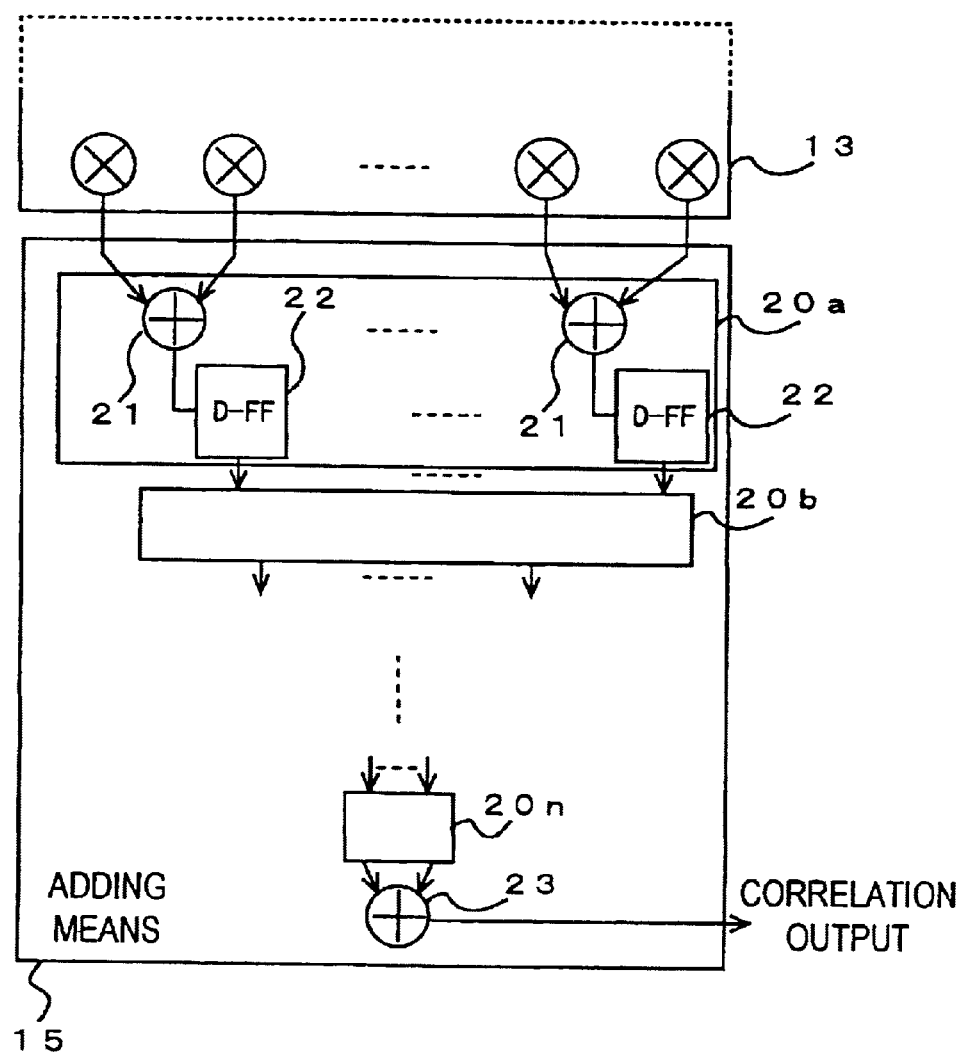
FIG. 13 is a block diagram of adding means 15.

The adding means 44 collectively adds/synthesizes the signals outputted by the multiplying means 42 to transmit the correlation output to the outside, and is considered to be the same as the conventional matched filter, for example, shown in FIG. 13.

The sliding correlator 33 receives the N bit signal outputted by the A/D converter 31, starts despreading on receiving a signal for allowing the despreading from the control circuit 34, and transmits the correlation output obtained by despreading the N bit signal as a demodulated signal to the outside.

Specifically, as shown in FIG. 3, the sliding correlator 33 comprises a multiplier 51, PN code register 52, adder 53 and delay element 54.

Here, the multiplier 51 multiplies PN code transmitted from the PN code register 52 and the N bit signal transmitted from the A/D converter 31 to emit an output.

The PN code register 52 receives the signal for allowing the despreading from the control circuit 34 to transmit the PN code to the multiplier 51.

The adder 53 adds signals transmitted from the multiplier 51 and delay element 54 over one symbol time to output the correlation output.

The delay element 54 delays the signal transmitted from the adder 53 only by one chip time to return its output to the adder 53.

Specifically, in the sliding correlator 33, the PN code outputted by the PN code register 52 and the N bit signal outputted by the A/D converter 31 are multiplied by the multiplier 51, the signal added only for one symbol time by the adder 53 and the signal returned via the delay element 54 are added to perform the despreading, and the correlation output obtained by despreading is transmitted to the outside as the demodulated signal.

The control circuit 34 receives the synchronization phase information detected by the searcher 32, and transmits to the sliding correlator 33 the signal for allowing the despreading to be performed from the phase.

An operation of the present circuit will next be described with reference to FIG. 1. The CDMA modulated analog signal is converted to the N bit digital signal by the A/D converter 31.

Subsequently, the searcher 32 receives a small number of most significant bits of the N bits, detects the synchronization phase as the symbol start position, and transmits the phase information of detected and captured synchronization to the control circuit 34.

The control circuit 34 then receives the synchronization phase information, and transmits to the sliding correlator 33 the signal for allowing the despreading to be performed from the phase indicated by the phase information. The sliding correlator 33 receives the signal, despreads the N bit digital signal outputted by the A/D converter 31, and transmits the obtained correlation output as the demodulated signal to the outside.

Additionally, as shown in FIG. 1, the present circuit is provided with a plurality of sliding correlators 33. In addition to the phase information of the direct wave, the searcher 32 may transmit the phase information of delayed signal (delay wave) to the control circuit 34 beforehand.

In this case, the control circuit 34 receives the phase information of the direct wave and delay wave from the searcher 32, successively selects the sliding correlator 33, and transmits to the selected sliding correlator 33 the signal for allowing the despreading to be performed in accordance with each phase information.

Specifically, on receiving the phase information of the direct wave, the control circuit 34 selects a first sliding correlator 33a, outputs the signal for allowing the despreading to be performed at the phase indicated by the phase information of the direct wave, and allows the first sliding correlator 33a to demodulate a direct wave signal.

Subsequently, on receiving the phase information of the first delay wave, the control circuit 34 selects a second sliding correlator 33b, outputs the signal for allowing the despreading to be performed at the phase indicated by the phase information of the first delay wave, and allows the second sliding correlator 33b to demodulate a first delay wave signal.

Thereafter, in the same manner, on receiving the phase information of the delay wave, the control circuit 34 successively selects a different sliding correlator 33, and transmits to the selected sliding correlator 33 the signal for allowing the despreading to be performed at the phase indicated by the phase information of the inputted delay wave, so that the delay wave signal is demodulated.

As described above, each sliding correlator 33 despreads and demodulates the direct wave or the delay wave, and RAKE synthesis can be performed by adjusting the timing and performing addition/synthesis.

An operation of searcher 32 shown in FIG. 2 will next be described in more detail.

Figure 4:
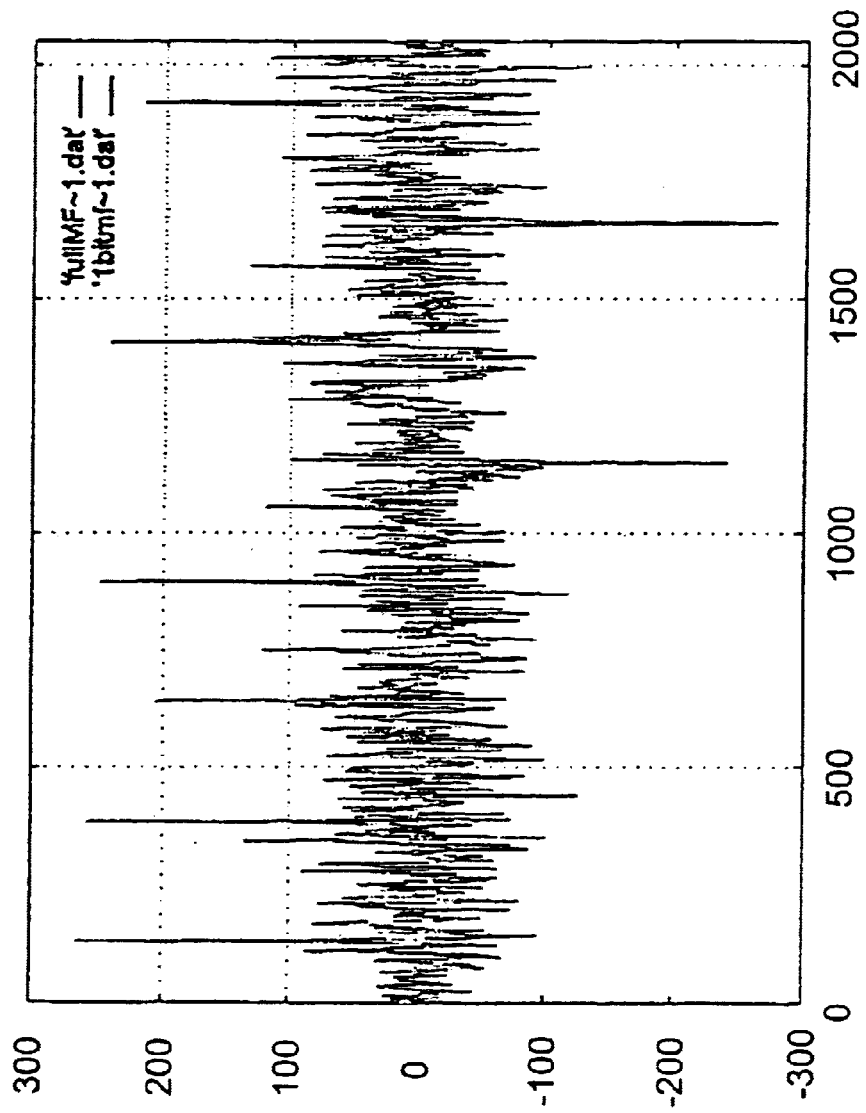
FIG. 4 is an explanatory view showing an example of a waveform of a signal outputted by the searcher 32.
Figure 5:
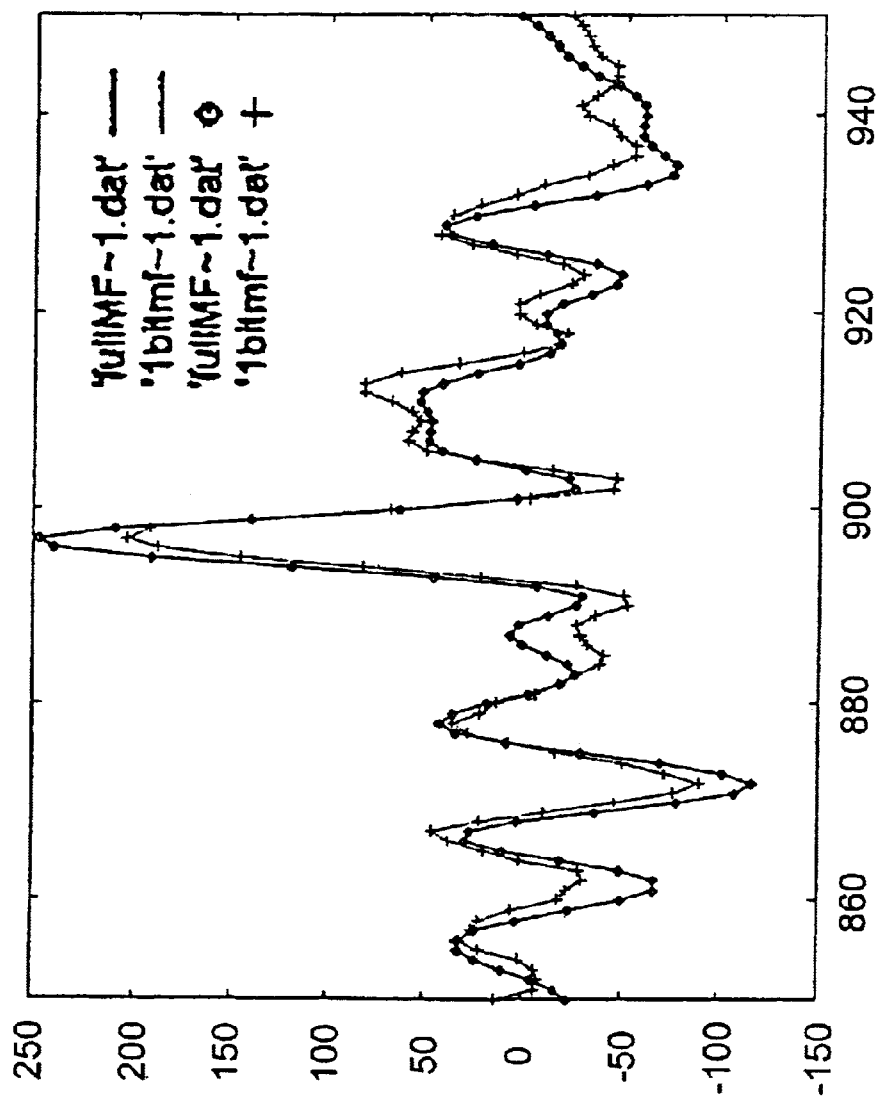
FIG. 5 is an enlarged view of a part of FIG. 4.

The searcher 32 shown in FIG. 2 emits the correlation output in time series. Specifically, correlation outputs are emitted as shown in FIGS. 4 and 5. FIG. 4 is an explanatory view showing an example of a signal waveform outputted by the searcher 32, and FIG. 5 is an enlarged view of a part of FIG. 4.

FIGS. 4 and 5 show cases where one bit of signal, and N bits of signal transmitted from the A/D converter 31 are transmitted to the searcher 32, respectively.

Moreover, in FIGS. 4 and 5, Eb/N0=15 dB, and experiment results are shown in static characteristics for signals subjected to four-times over-sampling. Here, Eb/N0 indicates a ratio of energy per bit to noise power density.

As shown in FIGS. 4 and 5, the correlation output peaks at every synchronization phase. Although there is a slight difference in peak height between the cases where the N bits are used and where only one bit is used, peak position indicates no change.

Specifically, it is experimentally confirmed that even if the small bit signal is used, the synchronization can be captured.

As described above, the power consumption of searcher 32 can effectively be reduced by using a small bit gate.

Furthermore, when the searcher 32 is intermittently operated in accordance with changes in phase information with time, the power consumption can be reduced more effectively. In this case, for example, it is proposed that the control circuit 34 operate the searcher 32 every constant time to obtain the phase information.

A function of the searcher is to obtain the correlation outputs of pilot symbols (four symbols) first captured by a mobile station or the like when power supply is turned on, or inserted in a so-called control channel or the like. In the control channel, the pilot symbol exist only by $4/10$ time among all time slots. Therefore, the searcher can intermittently be operated only $4/10$ time. In a data channel for the information, the proportion of pilot symbols is reduced, for example, to $8/640$.

According to the present circuit using the searcher 32 shown in FIG. 2, the power consumption can be reduced as shown in Table 1.

TABLE 1

|  | MF | Present Circuit | Sliding Correlator |
|---|---|---|---|
| Total Number of Gates | 1 | 0.5 | 3 |
| Total Power Consumption | 1 | 0.2 | 10 |

Figure 12:
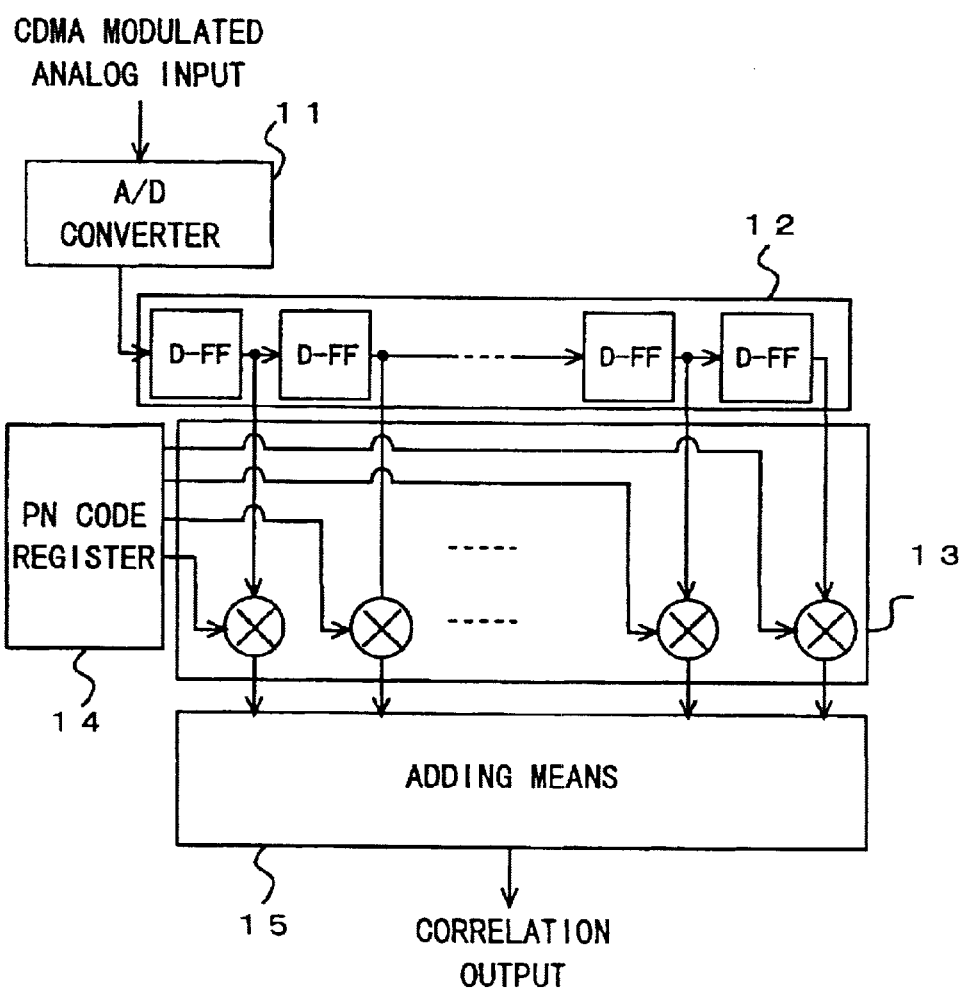
FIG. 12 is a block diagram of a despreading circuit using a conventional matched filter.

In Table 1, in the column of MF, the total number of gates of the despreading circuit using the conventional matched filter shown in FIG. 12, and the total power consumption are shown as "1" for comparison.

Moreover, the present circuit has half the total number of gates, and 0.2 times the total power consumption.

Additionally, in Table 1, the number of bits processed by the conventional matched filter is six, the number of bits processed by the searcher 32 of the present invention is one, and the time of intermittent operation is $1/8$.

Figure 11:
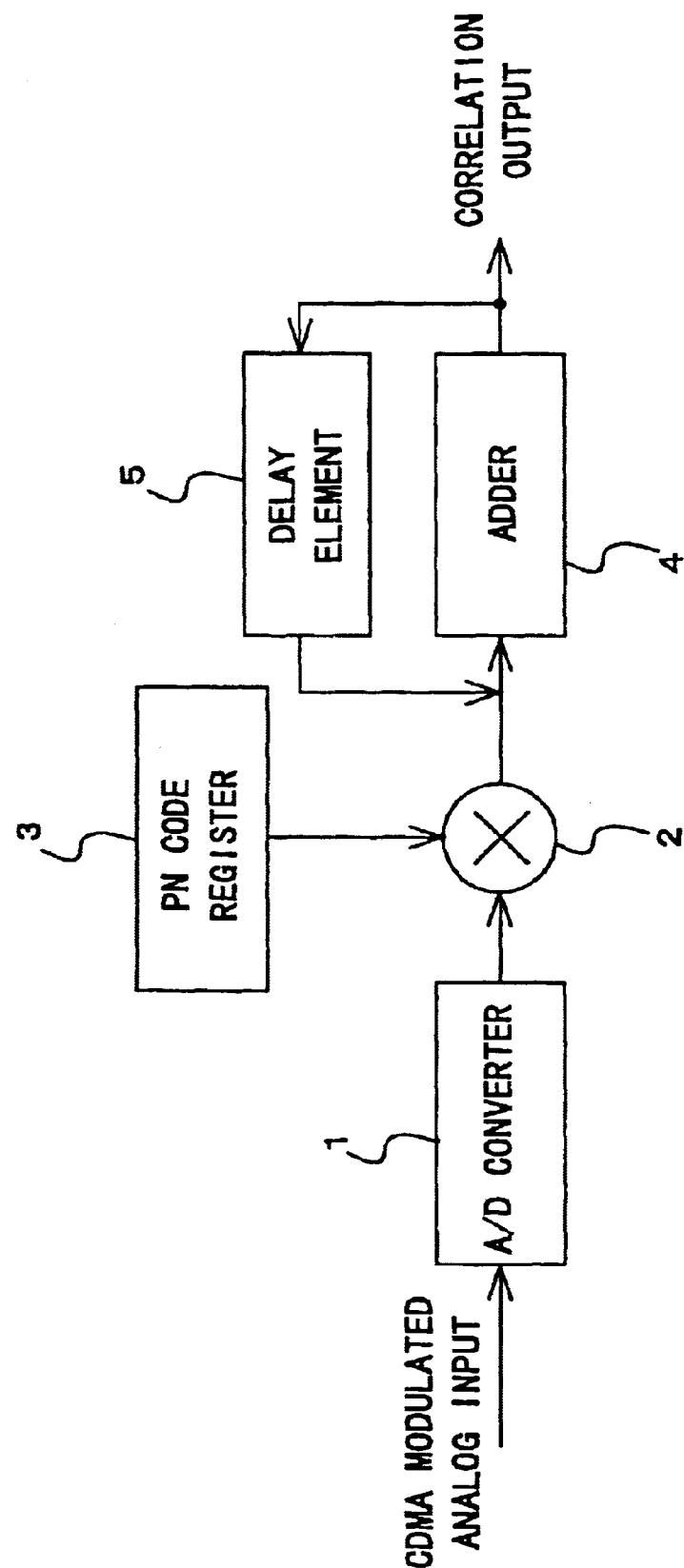
FIG. 11 is a block diagram of a conventional despreading circuit.

Furthermore, in the right column of Table 1, reference values are shown when the despreading circuits each using the conventional sliding correlator shown in FIG. 11 are provided corresponding to the number of chips to obtain the same effect as when the matched filter is used. The total number of gates is three times that of the conventional despreading circuit using the matched filter, and the total power consumption reaches ten times.

Additionally, three sliding correlators 33 are used for one direct wave or delay wave. The control circuit 34 allows the sliding correlators 33 to operate at a timing based on the phase information outputted by the searcher 32, its prior phase and post phase. Thereafter, an appropriate output is selected from the outputs of sliding correlators 33. In this case, demodulation precision can effectively be enhanced.

Figure 6:
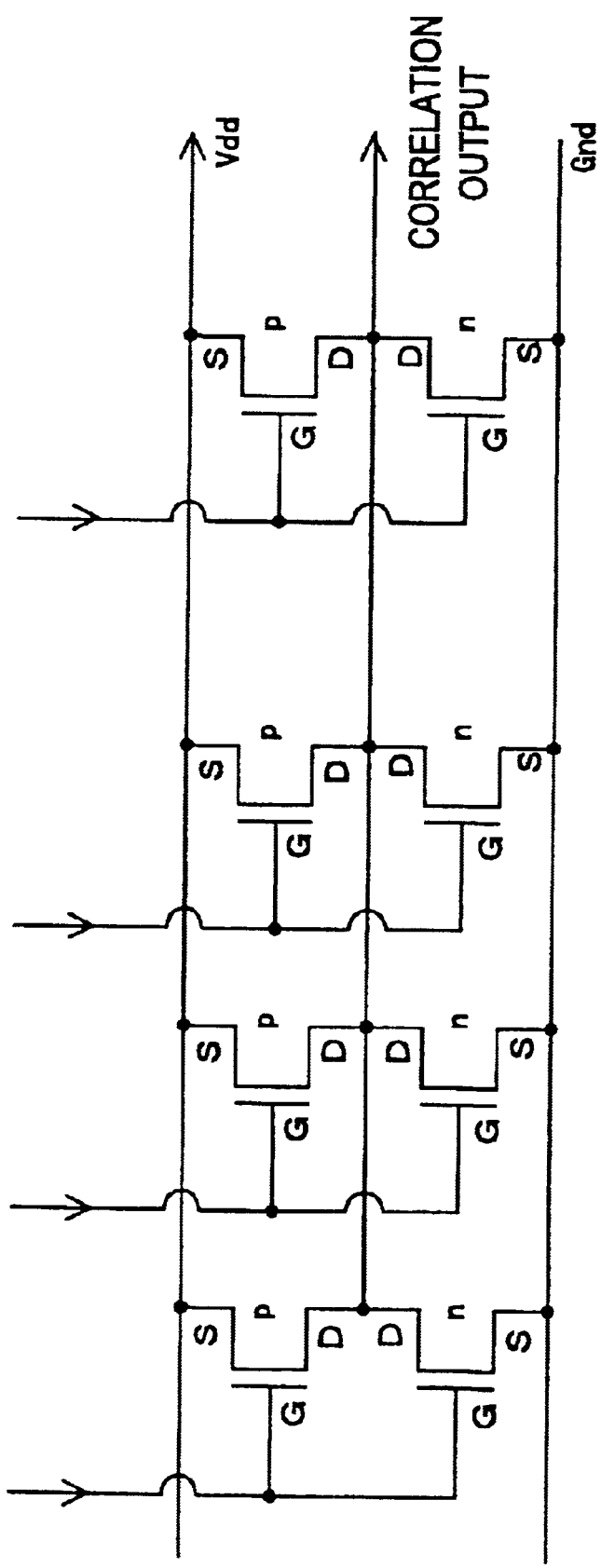
FIG. 6 is a circuit diagram showing an example of adding means 44 using CMOS inverters.

Adding means of the despreading circuit according to the embodiment of the present invention will next be described with reference to FIG. 6. FIG. 6 is a circuit diagram showing an example of adding means 44 using a CMOS inverter. The adding means 44 of searcher 32 shown in FIG. 6 is not a logic circuit shown in the adding means 15 of FIG. 13, but comprises a circuit using the CMOS inverter, so that the number of gates and circuit scale can be reduced.

As shown in FIG. 6, the adding means 44 using the CMOS inverter is provided with CMOS inverters (combinations of a pair of p-channel MOS and n-channel MOS) corresponding to the number of multipliers of multiplying means 42, i.e., the number of chips.

Additionally, in the following description, the p-channel MOS in the CMOS inverter is abbreviated as pMOS, while the n-channel MOS is abbreviated as nMOS.

A voltage Vdd is applied to each pMOS source terminal S, and each pMOS drain terminal D is connected to a correlation output terminal.

Moreover, the nMOS source terminal S is grounded to a level Gnd, and the nMOS drain terminal D is connected to the correlation output terminal in the same manner as the pMOS drain terminal.

Furthermore, a signal outputted by the corresponding multiplier of multiplying means 42 is supplied to pMOS and nMOS gate terminals G.

Specifically, for the pair of pMOS and nMOS, when the signal supplied to each gate terminal G is "1", the nMOS turns on, and pMOS turns off.

On the other hand, when the signal supplied to the gate terminal G is "0", the pMOS turns on, and nMOS turns off.

Subsequently, no voltage is added in a section where the nMOS turns on, the voltage is applied in a section where the pMOS turns on, and the signal obtained by adding the signals outputted by the multiplying means 42 can result at the correlation output terminal.

However, in most cases, the correlation output of searcher 32 forms an intermediate output. In the adding means 44 shown in FIG. 6, through currents supposedly flow to increase the power consumption. To solve the problem, it is proposed to give a long channel to each MOS transistor, so that the through currents are reduced.

Also in this case, since an unbalance in ON resistance of pMOS and nMOS cannot be avoided during manufacture, computation precision is supposedly deteriorated as compared with when the digital signal is processed.

Figure 7:
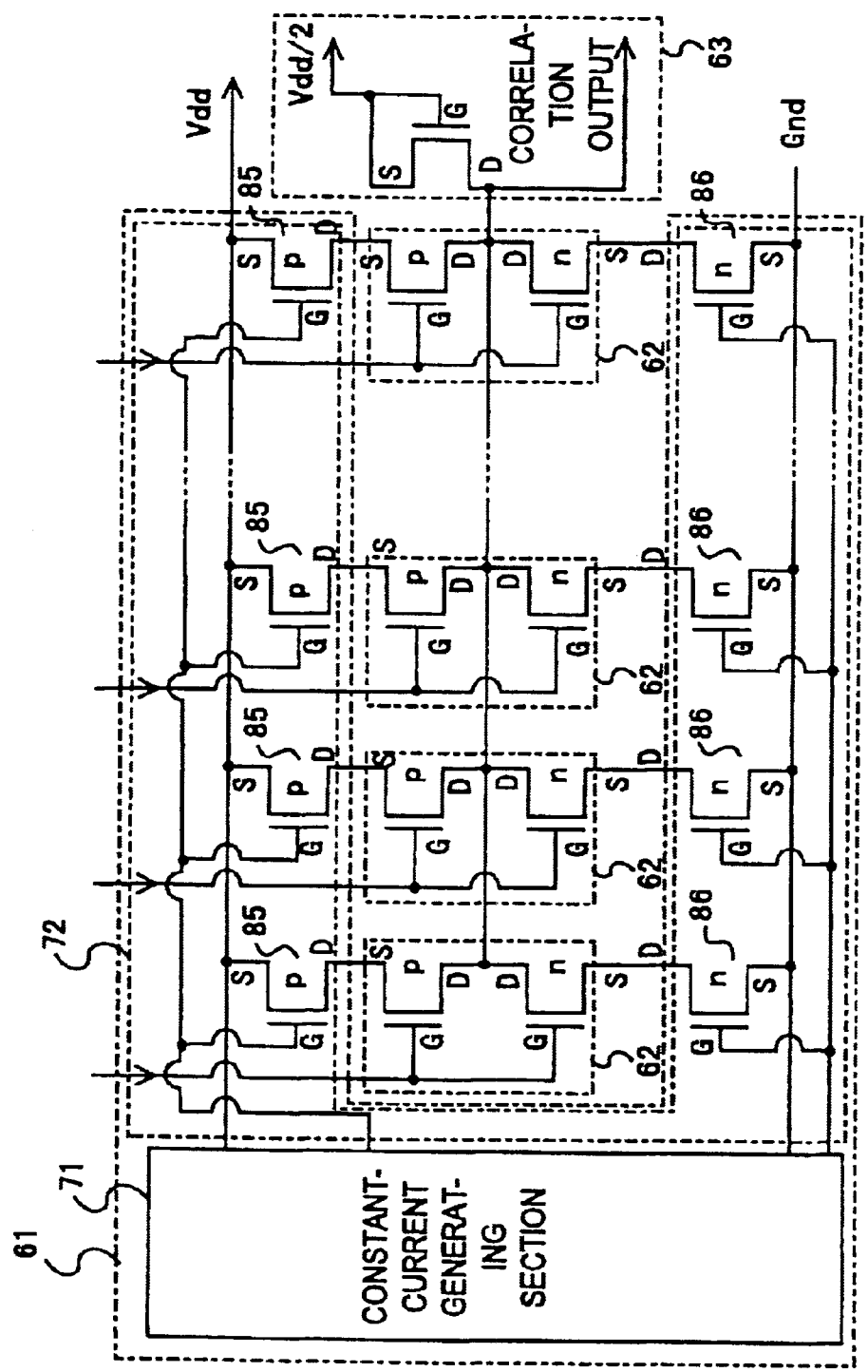
FIG. 7 is another circuit diagram of adding means 44 using the CMOS inverters.

Then, a circuit as shown in FIG. 7 is proposed. FIG. 7 is another circuit diagram of adding means 44 using the CMOS inverter, and FIG. 8 is a circuit diagram showing a circuit for supplying constant currents.

The adding means 44 shown in FIG. 7 is constituted of constant-current supply means 61 for supplying an electric current having a constant magnitude, a plurality of CMOS inverters 62 provided for the multipliers of multiplying means 42, and output means 63 for converting an electric current outputted by each CMOS inverter 62 to a voltage signal to emit an output.

Figure 8:
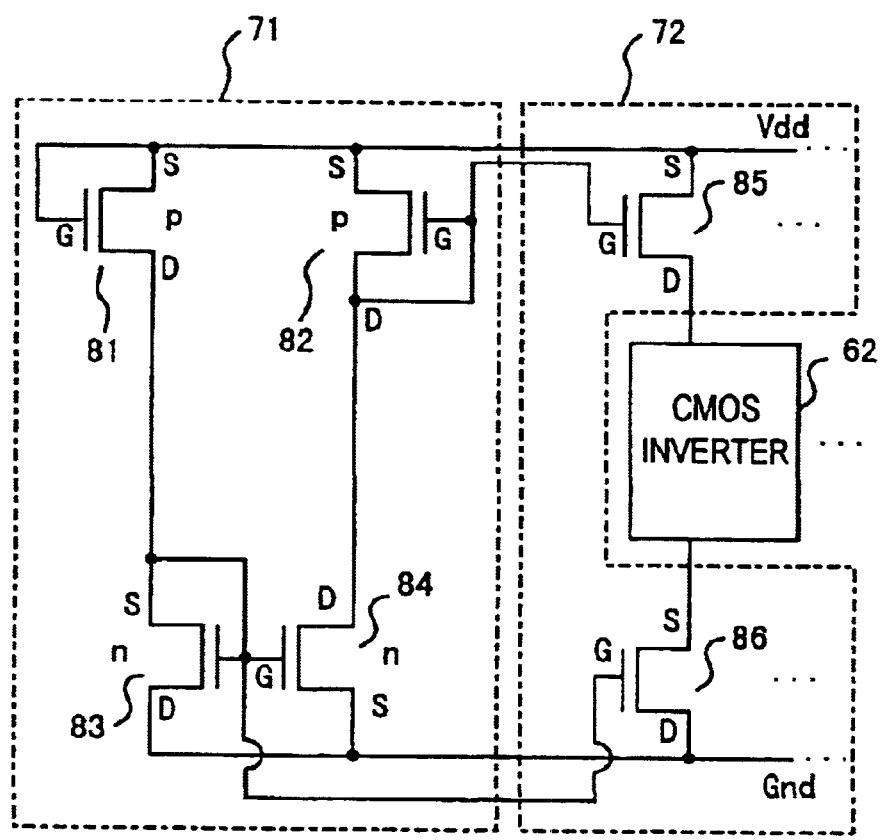
FIG. 8 is a circuit diagram showing a circuit for supplying constant currents.

As shown in FIG. 8, the constant-current supply means 61 is mainly constituted of a constant-current generating section 71 and a current supply section 72.

The constant-current generating section 71 is constituted of a p-channel MOS 81 with a long channel, p-channel MOS 82, first n-channel MOS 83, and second n-channel MOS 84.

Moreover, the current supply section 72 is constituted of a plurality of p-channel MOSs 85 provided for a plurality of CMOS inverters 62, and a plurality of n-channel MOSs 86 similarly for a plurality of CMOS inverters 62.

First, each section of constant-current generating section 71 will be described. A power voltage Vdd is applied to a source terminal S and gate terminal G of long-channel MOS 81.

Moreover, the drain terminal D of long-channel MOS 81 is connected to a source terminal S and gate terminal G of first n-channel MOS 83.

Therefore, the long-channel MOS 81 functions as a load having a large resistance.

A power voltage VDD is applied to a source terminal S of p-channel MOS 82, and a gate terminal G and drain terminal D thereof are connected to each gate terminal G of a plurality of p-channel MOSs 85 in the current supply section 72. The gate terminal G and drain terminal D of p-channel MOS 82 are also connected to a drain terminal D of second n-channel MOS 84.

Moreover, a drain terminal D of first n-channel MOS 83 is connected to ground Gnd. The gate terminal G of first n-channel MOS 83 and the gate terminal G of second n-channel MOS 84 are interconnected, and closely arranged on chip.

The gate terminal G of second n-channel MOS 84 is connected to the gate terminal G of first n-channel MOS 83 functioning as a diode, and the drain terminal D of first n-channel MOS 83 is connected to ground Gnd.

Additionally, the gate terminal G of first n-channel MOS 83 and the gate terminal G of second n-channel MOS 84 are connected to gate terminals G of a plurality of n-channel MOSs 86 in the current supply section 72.

Each section of current supply section 72 will next be described in detail. A source terminal S of p-channel MOS 85 is connected to a power voltage Vdd, and a gate terminal G thereof is connected to the gate terminal G and drain terminal D of p-channel MOS 82 and the drain terminal D of second n-channel MOS 84 of constant-current generating section 71.

Moreover, a drain terminal D of p-channel MOS 85 is connected to the corresponding pMOS source terminal S of CMOS inverter 62.

On the other hand, a drain terminal D of n-channel NOS 86 is connected to ground Gnd, and the gate terminal G thereof is connected to the gate terminal G and source terminal S of first n-channel MOS 83 and the gate terminal G of second n-channel MOS 84 of the constant-current generating section 71.

Moreover, the drain terminal D of n-channel MOS 86 is connected to the corresponding nMOS source terminal S of CMOS inverter 62.

An operation of constant-current supply means 61 will next be described.

Additionally, in the description below, ON resistance of long-channel MOS 81 is represented as R ON.

First, an electric current I0 flowing between the drain terminal D of long-channel MOS 81 and the drain terminal D of first n-channel MOS 83 is represented in Equation 1, in which Vth(MOS83) is Vth of first n-channel MOS 83.

$$I_o = \{V_{dd} - V_{th(MOS83)}\}/R_{ON} \quad \text{[Equation 1]}$$

Moreover, since the first n-channel MOS 83 and second n-channel MOS 84 are MOS transistors having the same characteristics, they are equal in voltage between gate and source. An electric current I1 flowing between the drain terminal D of p-channel MOS 82 and the drain terminal D of second n-channel MOS 84 is equal to the electric current I0.

Similarly, since the p-channel MOS 82 and each p-channel MOS 85 of current supply section 72 have the same characteristics, an electric current I2 supplied to the CMOS inverter 62 from the drain terminal D by the p-channel MOS 85 is equal to the electric current I1.

Furthermore, since the first n-channel MOS 83 and each n-channel MOS 86 of current supply section 72 have the same characteristics, an electric current I3 flowing between the drain terminal D of n-channel MOS 86 and the CMOS inverter 62 is equal to the electric current I0.

Specifically, the electric currents I2 and I3 are equal to each other and, as a result, absolute values of electric currents flowing through the p-channel MOS 85 and n-channel MOS 86 are equal to each other. When an electric current direction is noted, and the p-channel MOS 85 outputs a positive current, the n-channel MOS 86 outputs a negative current having the same magnitude.

The output means 63 converts the electric current outputted by each CMOS inverter 62 to a voltage signal, and transmits the correlation output to the outside.

Specifically, in the adding means 44 shown in FIG. 7, the CMOS inverter 62 functions as a switch simply for passing or cutting the electric current, and the magnitude of voltage Vdd intrinsically has no influence on addition results.

According to the adding means 44, since a dispersion in V TH of MOS transistors in the same chip is small, a difference in absolute value of the current supplied to each CMOS inverter 62 can remarkably be reduced. Furthermore, since the ON resistance of the long-channel MOS of constant-current supply means 61 is increased, the absolute value of the current supplied to each CMOS inverter 62 can be reduced. As a result, the ON resistance of the long-channel MOS of output means 63 can also be increased.

Therefore, even if there is a dispersion in MOS characteristics, the addition results are not influenced. The precision of addition results can effectively be enhanced, and the electric current supplied by the constant-current supply means 61 can be of the order of $\mu A$, so that the power consumption can be reduced.

Additionally, even if the absolute value of the supplied current varies with chips, the precision of addition results is not influenced.

Moreover, high resistance elements may be used instead of the long-channel MOS 81 and the long-channel MOS transistor of output means 63.

The power consumption when the adding means 44 shown in FIG. 7 is used in this manner will be described with reference to Table 2.

TABLE 2

|  | MF | Present Circuit | Sliding Correlator |
|---|---|---|---|
| Total Number of Gates | 1 | 0.2 | 3 |
| Total Power Consumption | 1 | 0.2 | 10 |

The column of MF in Table 2 is the same as the left column of Table 1, and "1" is shown for comparison.

Moreover, the present circuit has 0.2 times the total number of gates and also 0.2 times the total power consumption.

However, in Table 1, the number of bits processed by the conventional matched filter is six, the number of bits processed by the searcher 32 of the present invention is one, and the time of intermittent operation is ⅛.

Furthermore, the right column is the same as the right column of Table 1.

Moreover, here, for the sake of simplicity, the signal outputted by the multiplying means 42 is one bit, but may not be one bit as long as it is a small bit.

Figure 9:
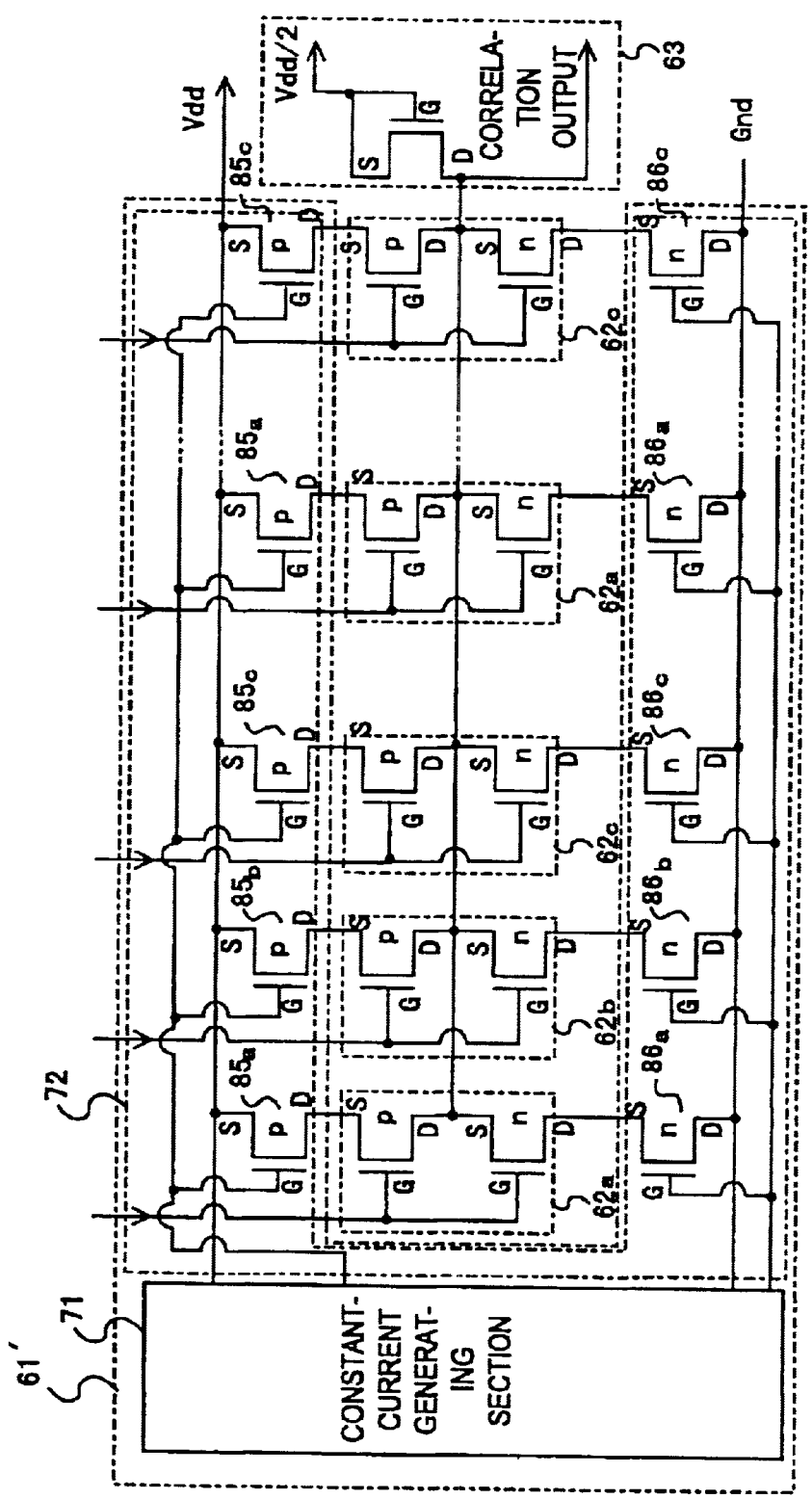
FIG. 9 is a circuit diagram of adding means 44, e.g., for three bits.

In this case, as shown in FIG. 9, the adding means 44 is constituted of a constant-current supply means 61', a plurality of CMOS inverters 62, and output means 63. FIG. 9 is a circuit diagram of adding means 44, for example, for three bits.

Here, the output means 63 is the same as the adding means 44 of FIG. 7.

Here, the CMOS inverter 62 is provided for each bit outputted by the multiplier of multiplying means 42.

Specifically, the number of inverters is the number of multipliers of multiplying means 42 multiplied by the number of bits. In FIG. 9, since the case for three bits is shown as an example, CMOS inverters 62a to 62c are provided for the bits.

The current supply section 72 of constant-current supply means 61' is basically the same as that of the adding means 44 of FIG. 7, but is slightly different in a section for supplying electric currents to each CMOS inverter 62.

Specifically, the current supply section 72 of constant-current supply means 61' is provided with p-channel MOSs 85a to 85c for supplying electric currents in accordance with the corresponding bit weight of each of CMOS inverters 62a to 62c, and n-channel MOSs 86a to 86c.

In a weighting method, as shown in FIG. 9, a channel width W of p-channel MOS 85 or n-channel MOS 86 of current supply section 72 is set to "1" for the CMOS inverter 62a corresponding to $2^0$ bits, "2" for the inverter corresponding to $2^1$ bits, and "4" times for the inverter corresponding to $2^2$ bits.

Figure 10A:
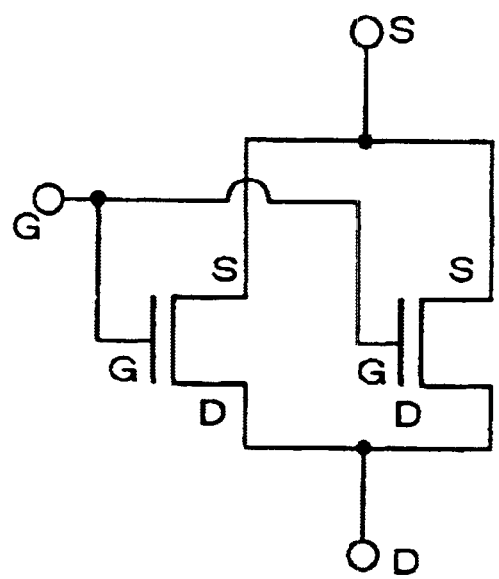
FIGS. 10A and 10B are circuit diagrams showing examples of MOS transistor for weighting.
Figure 10B:
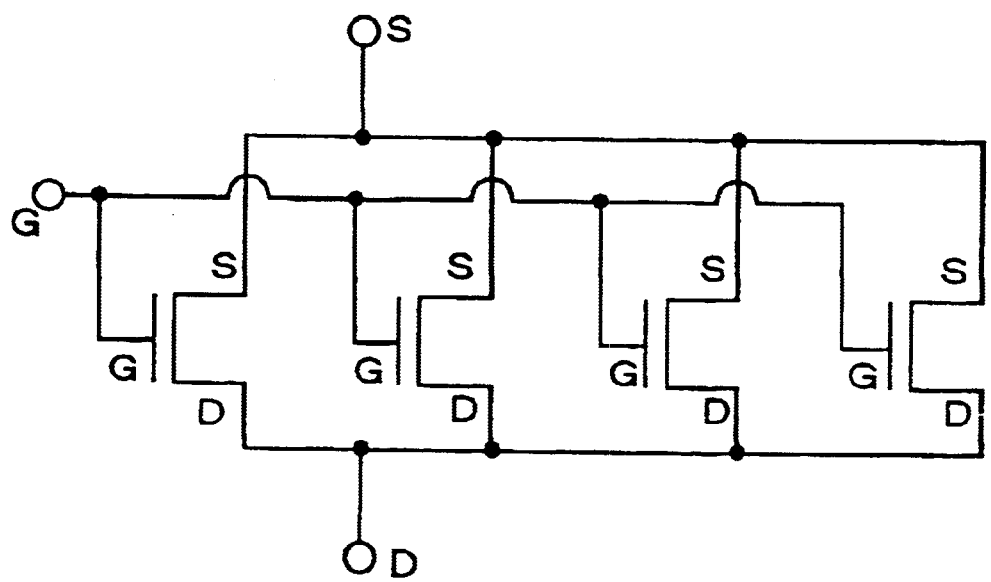

Moreover, when the channel width W is constant, as shown in FIG. 10A, p-channel MOS 85b and n-channel MOS 86b for supplying the electric current to the CMOS inverter 62b corresponding to $2^1$ bits may be combined in such a manner that two MOS transistors are arranged in parallel between drain terminal D and source terminal S. As shown in FIG. 10B, p-channel MOS 85c and n-channel MOS 86c corresponding to $2^2$ bits may be combined in such a manner that four MOS transistors are arranged in parallel between drain terminal D and source terminal S. FIG. 10 is a circuit diagram showing an example of MOS transistor for performing the weighting.

As described above, according to the p-channel MOS 85 and n-channel MOS 86 using a plurality of MOS transistors to supply the electric current in accordance with the bit weight, the precision of arithmetic operation can be made higher as compared with when the channel width is adjusted.

According to the present invention, the matched filter is used only as the searcher for performing the synchronization capture with the high-order small bits, and used as the despreading circuit for performing demodulation by the sliding correlator after the synchronization capture is attained, so that the circuit scale and power consumption can effectively be reduced.

What is claimed is:

1. A despreading circuit comprising:

an A/D converter for receiving a CDMA modulated analog signal and converting the analog signal to a digital signal of N bits to emit an output;

a searcher for detecting a synchronization phase as a symbol start point of the CDMA modulated analog signal based on a small number of most significant bits which is one or more bits but less than N bit digital signal outputted by said A/D converter to output phase information as signal indicating the synchronization phase;

a control circuit for outputting a signal for allowing despreading to be performed as a timing for starting the despreading in accordance with the phase information transmitted from said searcher; and a sliding correlator for receiving the signal for allowing said despreading to be performed, and starting the despreading of the N bit digital signal outputted by said A/D converter to output a correlation output for one symbol time as a demodulated signal;

wherein the searcher comprises a sample hold circuit comprising flip-flop circuits connected in multiple stages in accordance with the number of chips for, on receiving an input of digital signal, successively transmitting the digital signal to the next flip-flop circuit while holding said digital signal in the flip-flop circuit, multipliers for the flip-flop circuits of said sample hold circuit for, when the digital signal held by the flip-flop circuit connected to each multiplier is successively transmitted to the next flip-flop circuit, multiplying the digital signal and the corresponding bit of PN code as separately inputted spread code by each multiplier to emit an output, an adder for collectively adding the digital signals outputted by the multipliers to output the correlation output, and a PN code register for transmitting the PN code as the spread code to said multipliers.

2. The despreading circuit according to claim 1, wherein the adder has a plurality of COMS inverters corresponding to the bits in the digital signals outputted by the multipliers, to add outputs of the plurality of CMOS inverters and emit an output, and said COMS inverter outputs a voltage of a specific level when a value of the corresponding bit of the digital signals transmitted from said multipliers is "0", and outputs a voltage of a ground level when the value of said bit is "1".

3. The despreading circuit according to claim 1, wherein the adder comprises a circuit for supplying an electric current in accordance with each bit value in the digital signals outputted by the multipliers, a CMOS inverter provided for each bit in the digital signals outputted by the multipliers to output a specific positive current when the corresponding bit value of the digital signals is "0" and output a specific negative current when said bit value is "1", and a circuit for converting the electric currents outputted by said plurality of CMOS inverters to voltage signals to emit outputs.

4. The despreading circuit according to claim 1, wherein the circuit for supplying the electric current comprises electric current input and output MOS transistors for the CMOS inverters, and said MOS transistor is weighted in accordance with each bit in the digital signals outputted by the multipliers.

* * * * *